Figure 1:
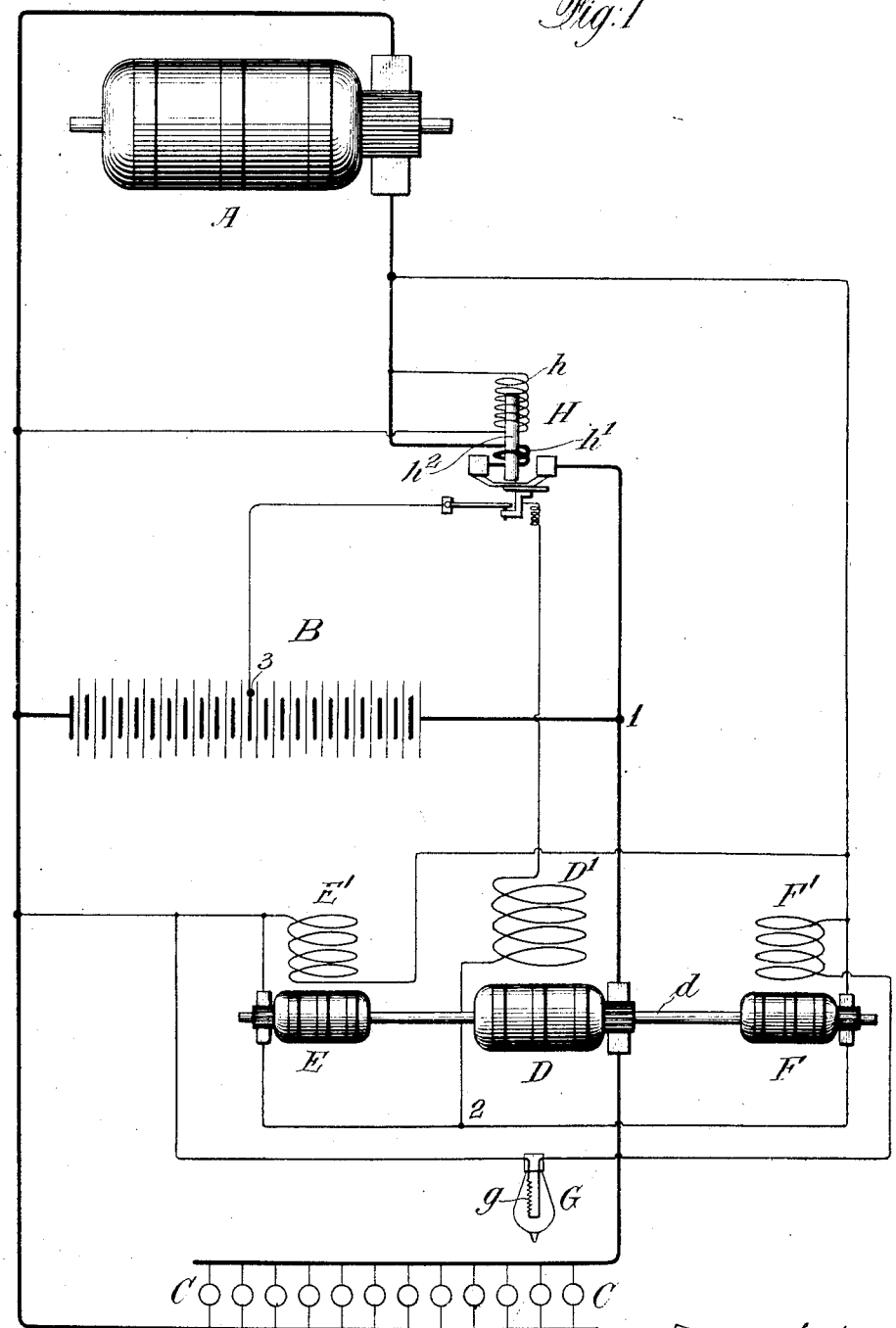

No. 852,687. PATENTED MAY 7, 1907.
W. A. TURBAYNE.
ELECTRICAL SYSTEM OF DISTRIBUTION.
APPLICATION FILED JULY 25, 1906.

2 SHEETS—SHEET 2.

Witnesses
D. Harold Bush
John O. Gempler

Wm A Turbayne
Inventor
By his Attorneys Kenyon & Kenyon

UNITED STATES PATENT OFFICE.

WILLIAM A. TURBAYNE, OF LANCASTER, NEW YORK, ASSIGNOR TO GOULD COUPLER COMPANY, A CORPORATION OF NEW YORK.

ELECTRICAL SYSTEM OF DISTRIBUTION.

No. 852,687.     Specification of Letters Patent.     Patented May 7, 1907.

Application filed July 25, 1906. Serial No. 327,594.

*To all whom it may concern:*

Be it known that I, WILLIAM A. TURBAYNE, a citizen of the United States, and a resident of Lancaster, in the county of Erie, State of New York, have invented certain new and useful Improvements in Electrical Systems of Distribution, of which the following is a specification.

My invention relates to automatic regulation in electrical systems of distribution.

It is illustrated and described in connection with the regulation of a car lighting system for which I specially devised my invention but the invention is applicable to other systems of distribution.

In car lighting systems it is usual to employ a dynamo driven from the car axle, a storage battery connected in parallel with the dynamo and lamps fed from the terminals of the battery. It is important that the voltage in the lamp circuit or working circuit should be maintained steady within very close limits. On the other hand, it is practically impossible, despite special regulation, to maintain the voltage of the main dynamo constant because of the widely varying speed to which it is subjected. Moreover, it is necessary to bring the voltage of the main dynamo up to a value higher than that required by the lamps in order that the battery may be charged by the dynamo. For this reason it has been customary to provide some means to maintain the constancy of potential at the lamp circuit despite fluctuations of voltage across the generator and battery.

The specific embodiment of my invention herein illustrated and described includes a dynamo which acts as a crusher and is placed in one of the main conductors between a junction of the battery and generator and the lamp circuit, this dynamo being regulated to maintain the desired constancy across the lamp circuit.

In accordance with my invention, the dynamo to be regulated is regulated by a coil influenced by the relation between the electro-motive-forces of two electric motors placed in series with each other, such motors being differently affected by the fluctuations of the system, while the controlling coil is connected at one end to a point between the two motors, the other end being preferably connected to the battery.

Specifically my invention involves the mechanical connection of the crusher or dynamo to be regulated to the two electric motors, which latter are connected in series in a branch circuit across the generator. The field magnets of the two motors are wound or arranged so that one of them will be markedly affected by the fluctuations of voltage of the generator, while the other is not substantially affected thereby. The two motors preferably give equal electro-motive-forces when the voltage of the generator is that required at the lamp circuit, and one end of the controlling coil is connected to the battery midway its terminals so that at the time of what may be called normal generator voltage, the two ends of the controlling coil are subjected to the same potential difference and no current will flow therein. When, however, the fluctuations cause the two motors to relatively vary in electro-motive-force, a current is developed in the controlling coil and therefore a voltage is developed in the crusher. In the presence instance, I prefer that this voltage should always be in the same direction, but this is merely a matter of adjustment, the device, as illustrated, being entirely capable of reversal of current in the controlling coil. The controlling coil in the present instance is the field magnet winding of the crusher.

Figure 2:
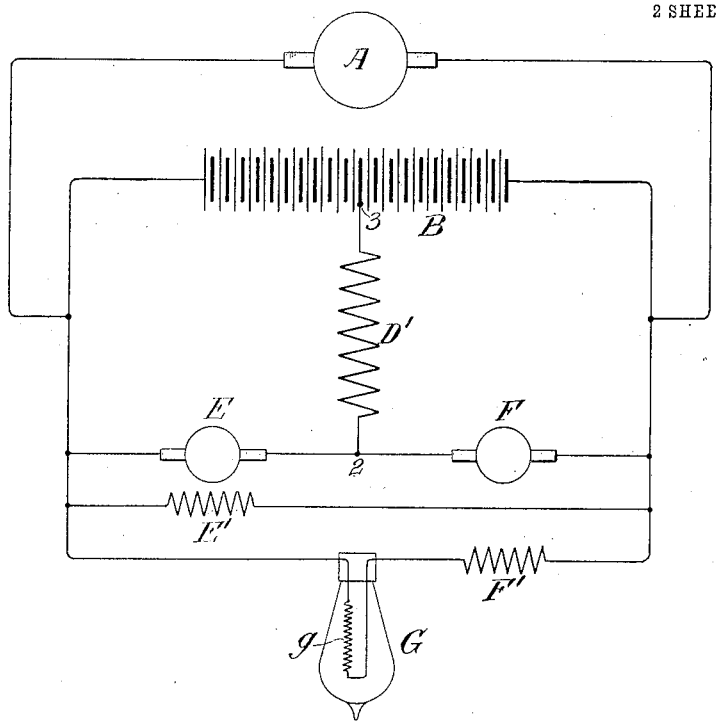
Figure 3:
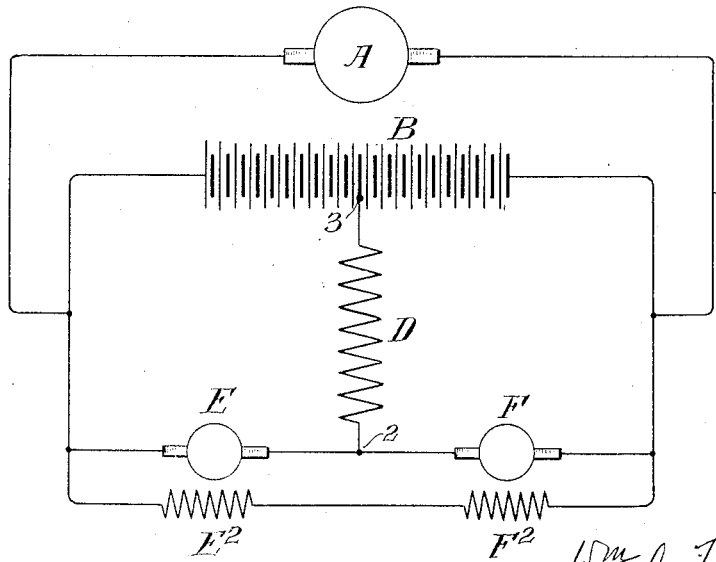

Figure 1 of the accompanying drawings illustrates diagrammatically a car lighting system embodying the various features of my invention. Fig. 2 is a simplification of certain portions of the system of Fig. 1 in order to more clearly illustrate the mode of operation of the apparatus. Fig. 3 is a simplified diagram illustrating a modification in detail.

A is a main generator which in the present instance is a variable speed generator driven from the car axle.

B is a storage battery connected in parallel to the generator with reference to the lamp circuit C.

D is the armature of the crusher placed between the junction 1 of the battery and generator circuits and the lamp circuit C.

E and F are the armatures of two electric motors mechanically connected to the armature D through the shaft $d$. E', F' are the respective field windings for these motors. The field winding E' is in shunt to the generator. The field winding F' is also in shunt to the generator, but in the shunt circuit is a device G to prevent the fluctuations of voltage of the generator from being felt to any substantial extent on the coil F'. This device G is indicated as operating because of a hot iron wire resistance $g$. This absorbs the greater part of the fluctuations because the wire $g$ is designed to be at a critical temperature where slight changes of current vary its resistance in much greater degree than the current variations. The result is that there may be a considerable variation of voltage across the circuit containing the coil F' and the coil G but only a small portion of the change of voltage will be felt in the coil F', the substantial variation being developed across the iron wire resistance $g$. It will be seen, therefore, that the motor E, having a field directly subjected to the fluctuations of voltage of the system, will tend to vary in the electro-motive-force it generates to a substantial extent, while the armature F will vary to only a negligible extent.

The field winding D' of the crusher is connected at one terminal 2 to the circuit containing the armatures E and F, this point 2 being between the two motors and therefore having a potential that varies according as the motors E and F vary relatively to each other. The other end of the circuit containing the controlling field coil D' is connected at the point 3 to the battery midway its terminals. The result is that one side of the coil D' will always be subjected to a potential equal to one-half the potential difference across the battery, while the other end of the controlling coil will be subjected to a varying difference of potential, being equal to one half of the total potential difference across the battery only when the motors E and F are developing equal electromotive forces. I prefer to adjust this system so that this occurs when the voltage of the generator is exactly that required by the circuit C. At this time, therefore, no current will flow through the coil D' and no electro-motive-force will be developed by the armature D. When, therefore, the generator A produces a higher voltage to charge the battery, the field strength of the motor E rises substantially, causing that motor to produce a greater electro-motive-force than motor F. Current will therefore flow through coil D' from 2 to 3 and this will produce an electro-motive-force in the crusher armature D which will oppose the electro-motive-force of the generator just sufficiently to leave the same constant voltage on the circuit C.

H is an automatic safety switch. This has been assumed to be closed in the foregoing description. It comprises a shunt coil $h$ and a series coil $h'$ acting upon a core $h^2$ to close the main circuit and the circuit of coil D' simultaneously. This switch is closed by its shunt coil $h$ when sufficient voltage is generated by A. If at any time the voltage on generator A falls sufficiently to cause a current from the battery to discharge to the generator this reversed current in the coil $h'$ will so weaken the flux as to open the switch.

In Fig. 3 I have indicated that the same mode of operation may be carried on without the employment of the device G. In this case the motor field coils $E^2$ and $F^2$ are connected in series, one of them being so wound as to produce a substantially saturated field magnet, while the other is so wound as to produce a field magnet having a low flux density. In this case, as before, changes of voltage across the system will unequally affect the two motors and therefore produce the regulation desired.

While I have illustrated my invention in connection with regulation for fluctuations of voltage it is to be understood that the invention is not limited to regulation of this character, and, moreover, that it may be modified in various details without departing from the scope of the invention as set out in the appended claims.

I have described and illustrated the controlling coil as connected at one end to the center of the battery, while the two motors are connected across the generator circuit. It is obvious that an entire battery need not be used for these regulating circuits, it being only important that where the motors are normally equal the controlling coil be connected midway of that portion of the battery to the terminals of which the circuit of the two motors is connected. Where I speak in the claims of connecting the coil midway the terminals of the battery, I have such an obvious modification in mind.

Having thus described my invention, what I claim as new and desire to protect by Letters Patent is,—

1. In an electrical system of distribution, a regulating coil, two electro-motive force generators in series with each other, a circuit containing the regulating coil connected at one end to a point between said electro-motive-force generators, and means for causing variations of electrical condition of the system to affect the relative electro-motive-forces produced by said generators.

2. In an electrical system of distribution, a regulating coil, two electro-motive-force generators in series with each other, a circuit containing the regulating coil connected at one end to a point between said electro-motive-force generators and at the other end to an independently produced potential difference, and means for causing variations of electrical condition of the system to affect the relative electro-motive-forces produced by said generators.

3. In an electrical system of distribution, a regulating coil, two electro-motive-force generators in series with each other, a circuit containing the regulating coil connected at one end to a point between said electro-motive-force generators and at the other end to an independently produced potential difference, and means for causing variations of electrical condition of the system to affect the relative electro-motive-forces produced by said generators and produce a varying resultant potential difference across said regulating coil.

4. In an electrical system of distribution, two electric motors in series with each other across a varying voltage circuit and differently affected by such varying voltage, and a regulating coil connected to be controlled in accordance with the relative changes of electro-motive-force of the two motors.

5. In an electrical system of distribution, two electric motors in series with each other across a varying voltage circuit and differently affected by such varying voltage, mechanical connections between said motors, and a regulating coil connected to be controlled in accordance with the relative changes of electro-motive-force of the two motors.

6. The combination with a varying voltage circuit of two electric motors in series across said circuit, a branch circuit connected across said varying voltage circuit, a regulating coil connected at one end between said motors and at the other end to a point in the branch circuit having a voltage equal to that at the other end of the regulating coil with a given voltage on the varying voltage circuit, and means for causing variations from said given voltage to differently affect the two motors.

7. The combination with a varying voltage circuit of two electric motors in series across said circuit, mechanical connections between them, a branch circuit connected across said varying voltage circuit, a regulating coil connected at one end between said motors and at the other end to a point in the branch circuit having a voltage equal to that at the other end of the regulating coil with a given voltage on the varying voltage circuit, and means for causing variations from said given voltage to differently affect the two motors.

8. The combination with a varying voltage circuit of a branch circuit connected thereto, two motors producing equal electromotive forces at a given voltage of the varying voltage circuit, a second branch circuit connected across said varying voltage circuit, a regulating coil connected at one end to a point electrically midway in the second branch circuit and at the other end to a point in the other branch circuit between said motors, and means for causing the said varying voltage to differently affect the two motors.

9. The combination with a varying voltage circuit of a branch circuit connected thereto, two motors producing equal electro-motive-forces at a given voltage of the varying voltage circuit, mechanical connections between said motors, a second branch circuit connected across said varying voltage circuit, a regulating coil connected at one end to a point electrically midway in the second branch circuit and at the other end to a point in the other branch circuit between said motors, and means for causing the said varying voltage to differently affect the two motors.

10. In an electrical system of distribution, two electric motors in series across the system, a regulating coil, means for causing changes of electrical condition of the system to differently affect the two motors, and means for varying the current in the regulating coil in accordance with the difference between the two motors.

11. In an electrical system of distribution, two electric motors mechanically connected together and electrically connected in series across the system, a regulating coil, means for causing changes of electrical condition of the system to differently affect the two motors, and means for varying the current in the regulating coil in accordance with the difference between the two motors.

12. In an electrical system of distribution, a pair of electric motors connected in series, a battery connected to the said motors, a regulating coil connected at one end to a point between the battery terminals and at the other end to a point between the motors, and means for causing changes of electric condition of the system to differently affect the field strengths of said motors.

13. In an electrical system of distribution, a pair of electric motors mechanically connected together and electrically connected in series, a battery connected to the said motors, a regulating coil connected at one end to a point between the battery terminals and at the other end to a point between the motors, and means for causing changes of electric condition of the system to differently affect the field strengths of said motors.

14. In an electrical system of distribution, a pair of electric motors connected in series, a battery connectd to the said motors, a dynamo mechanically connected to the two motors, a controlling coil therefor connected at one end between the motors and at the other end to the battery, and means for causing changes of electric condition of the system to differently affect the field strengths of said motors.

15. In an electrical system of distribution, a pair of normally equal electric motors connected in series, a battery connected to the said motors, a regulating coil connected at one end to a point midway the battery terminals and at the other end to a point between the motors, and means for causing changes of electric condition of the system to differently affect the field strengths of said motors.

16. In an electrical system of distribution, a pair of normally equal electric motors mechanically connected together and electrically connected in series, a battery connected to the said motors, a regulating coil connected at one end to a point midway the battery terminals and at the other end to a point between the motors, and means for causing changes of electric condition of the system to differently affect the field strengths of said motors.

17. In an electrical system of distribution, a pair of normally equal motors connected in series across the system, a battery also connected across the system, a dynamo mechanically connected to the two motors, a controlling coil therefor connected at one end between the motors and at the other end midway the battery terminals, and means for causing changes of electric condition of the system to differently affect the field strengths of said motors.

18. The combination of a generator producing a varying voltage, a circuit requiring a constant voltage, a dynamo in series between the generator and said circuit, two electric motors mechanically connected to said dynamo and electrically in series with each other, a controlling coil for said dynamo connected at one end to the circuit between said motors, and means for causing said varying voltage to unequally affect the field strengths of said motors.

19. The combination of a generator producing a varying voltage, a circuit requiring a constant voltage, a dynamo in series between the generator and said circuit, two electric motors mechanically connected to said dynamo and electrically in series with each other, a field magnet coil for said dynamo connected at one end to the circuit between said motors, and means for causing said varying voltage to unequally affect the field strengths of said motors.

20. The combination of a generator, a battery connected thereto, a work circuit, a dynamo whose armature is in series with the work circuit and beyond the battery connection, two electric motors mechanically connected to said dynamo and in series with each other, means for causing voltage variations of said generator to differently affect the field-strength of said motors, and a controlling coil for said dynamo so connected that its current is governed by the difference between the potential differences across the two motors.

21. The combination of a generator, a battery connected thereto, a work circuit, a dynamo whose armature is in series with the work circuit and beyond the battery connection, two electric motors mechanically connected to said dynamo and in series with each other, means for causing voltage variations of said generator to differently affect the field strength of said motors, and a field magnet coil for said dynamo so connected that its current is governed by the difference between the potential differences across the two motors.

22. The combination of a generator, a battery connected thereto, a work circuit, a dynamo whose armature is in series with the work circuit and beyond the battery connection, two electric motors mechanically connected to said dynamo and in series with each other, means for causing voltage variations of said generator to differently affect the field-strength of said motors, and a controlling coil for said dynamo connected at one end between the two motors and at the other to a point between the battery terminals.

23. The combination of a generator, a battery connected thereto, a work circuit, a dynamo whose armature is in series with the work circuit and beyond the battery connection, two normally equal electric motors mechanically connected to said dynamo and in series with each other, means for causing voltage variations of said generator to differently affect the field-strength of said motors, and a field magnet coil for said dynamo connected at one end between the motors and at the other midway the battery terminals.

24. In a regulating apparatus, two electric motors in series, one having a substantially constant field strength and the other a field varied according to the variations for which regulation is to be provided, a dynamo, and a controlling coil therefor connected at one end to a point between the two motors.

25. In a regulating apparatus, two electric motors in series, one having a substantially constant field strength and the other a field varied according to the variations for which regulation is to be provided, a dynamo mechanically connected to the motors, and a controlling coil therefor connected at one end to a point between the two motors.

26. In a regulating apparatus, two electric motors in series, one having a substantially constant field strength and the other a field varied according to the variations for which regulation is to be provided, a dynamo, and a field magnet coil therefor connected at one end to a point between the two motors.

27. In a regulating apparatus, two electric motors in series, one having a substantially constant field strength and the other a field varied according to the variations for which regulation is to be provided, a dynamo mechanically connected to the motors, and a field magnet coil therefor connected at one end to a point between the two motors.

28. The combination with a circuit having a varying voltage, a circuit requiring a constant voltage, a dynamo between the two, two electric motors mechanically connected to the dynamo, means for maintaining the field of one of said motors substantially constant and for varying the other responsively to said varying voltage, and a controlling coil for said dynamo, connected at one end to a point between the two motors.

29. In a regulating apparatus, two electric motors in series, one having a substantially constant field strength and the other a field varied according to the variations for which regulation is to be provided, a dynamo, a controlling coil therefor connected at one end to a point between the two motors, a source of potential difference, and a connection from the other end of said controlling coil to said source.

30. In a regulating apparatus, two electric motors in series, one having a substantially constant field strength and the other a field varied according to the variations for which regulation is to be provided, a dynamo mechanically connected to the motors, a controlling coil therefor connected at one end to a point between the two motors, a source of potential difference, and a connection from the other end of said controlling coil to said source.

31. In a regulating apparatus, two electric motors in series, one having a substantially constant field strength and the other a field varied according to the variations for which regulation is to be provided, a dynamo, a field magnet coil therefor connected at one end to a point between the two motors, a source of potential difference, and a connection from the other end of said controlling coil to said source.

32. In a regulating apparatus, two electric motors in series, one having a substantially constant field strength and the other a field varied according to the variations for which regulation is to be provided, a dynamo mechanically connected to the motors, a field magnet coil therefor connected at one end to a point between the two motors, a source of potential difference, and a connection from the other end of said controlling coil to said source.

33. The combination with a circuit having a varying voltage, a circuit requiring a constant voltage, a dynamo between the two, two electric motors mechanically connected to the dynamo, means for maintaining the field of one of said motors substantially constant and for varying the other responsively to said varying voltage, a controlling coil for said dynamo, connected at one end to a point between the two motors, a source of potential difference, and a connection from the other end of said controlling coil to said source.

In testimony whereof, I have signed my name to this specification, in the presence of two subscribing witnesses.

WILLIAM A. TURBAYNE.

Witnesses:
   HENRY C. STEPHAN,
   F. M. PATTERSON.